United States Patent
Ha et al.

(10) Patent No.: US 11,558,319 B2
(45) Date of Patent: Jan. 17, 2023

(54) METHOD FOR DETERMINING TARGETS FOR TRANSMITTING INSTANT MESSAGES AND APPARATUS THEREOF

(71) Applicant: KAKAO CORP., Jeju-si (KR)

(72) Inventors: Yong Ho Ha, Seongnam-si (KR); Se Hwan Bae, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 17/243,571

(22) Filed: Apr. 29, 2021

(65) Prior Publication Data
US 2022/0353214 A1    Nov. 3, 2022

(51) Int. Cl.
*H04L 51/04*     (2022.01)
*G06N 5/04*      (2006.01)
*G06N 20/00*     (2019.01)

(52) U.S. Cl.
CPC .............. *H04L 51/04* (2013.01); *G06N 5/04* (2013.01); *G06N 20/00* (2019.01)

(58) Field of Classification Search
CPC .......... G06N 5/04; G06N 20/00; G06N 3/006; G06N 3/0454; G06N 5/022; H04L 51/04; G06F 16/739; G06F 16/953; G06K 9/6256; G06Q 10/00; G06Q 30/0249
See application file for complete search history.

(56) References Cited

U.S. PATENT DOCUMENTS

| | | | |
|---|---|---|---|
| 10,853,424 B1* | 12/2020 | Mandaviya | G06F 16/953 |
| 2017/0011577 A1* | 1/2017 | Frank | G06Q 10/00 |
| 2019/0182059 A1* | 6/2019 | Abdou | G06N 20/00 |
| 2019/0188320 A1* | 6/2019 | Gordon | G06F 16/739 |
| 2019/0347563 A1* | 11/2019 | Bruno | G06N 5/022 |
| 2019/0362252 A1* | 11/2019 | Miller | G06N 5/04 |
| 2020/0306638 A1* | 10/2020 | Fear | G06N 3/006 |
| 2021/0035132 A1* | 2/2021 | Kopikare | G06K 9/6256 |
| 2021/0104087 A1* | 4/2021 | Smith | G06N 3/0454 |
| 2021/0224858 A1* | 7/2021 | Khoury | G06Q 30/0249 |

* cited by examiner

Primary Examiner — Le H Luu
(74) Attorney, Agent, or Firm — Cantor Colburn LLP (57) ABSTRACT

Disclosed is a method of transmitting an instant message. The method includes collecting previous round responses to an instant message transmitted to previous round transmission targets determined from a user group, identifying users who react to the instant message using a chat room by which the instant message is received based on the previous round responses, training a machine learning model that predicts a response of a user as to whether the user is to react to the instant message based on the previous round responses and characteristics of the identified users, determining a current round transmission target from the user group based on the trained machine learning model, and transmitting the instant message to the determined current round transmission target.

11 Claims, 6 Drawing Sheets

METHOD FOR DETERMINING TARGETS FOR TRANSMITTING INSTANT MESSAGES AND APPARATUS THEREOF

BACKGROUND

1. Field of the Invention

One or more example embodiments relate to a method and apparatus for determining targets for a transmission of instant messages, and more particularly, to a machine learning model.

2. Description of the Related Art

Various types of advertisements are made to inform users or potential consumers of products or services and change their attitudes toward the products or services. The advertising effects of such advertisements may be changed by an instant message, based on whom the instant message is transmitted. Thus, how users who are targets to which the instant message is to be transmitted is determined may influence the advertising effects.

To determine such instant message transmission targets, profiling and clustering technologies may be used to generate a profile of a user who is to be a candidate for the targets. However, there may still be issues, such as, for example, determining an instant message preferred by a user with a certain profile or determining a user with a profile who prefers an instant message.

Machine learning, a field of artificial intelligence, is applied to develop algorithms and methods that are to be learned by computers. Machine learning is used to predict a characteristic of an unknown new input using characteristics that are learned based on training data. For example, a machine learning model that is trained based on training data including regular mails and spam mails may predict whether a newly received mail is a spam mail.

SUMMARY

According to an aspect, there is provided an operating method of a sever for transmitting an instant message through a plurality of rounds, the operating method including collecting previous round responses to an instant message transmitted to previous round transmission targets determined from a user group, identifying users who react to the instant message using a chat room by which the instant message is received based on the previous round responses, training a machine learning model that predicts a response of a user as to whether the user is to react to the instant message based on the previous round responses and characteristics of the identified users, determining a current round transmission target from the user group based on the trained machine learning model, and transmitting the instant message to the determined current round transmission target.

The previous round responses may be determined based on whether users included as the previous round transmission targets react to the instant message using the chat room by which the instant message is received.

The determining of the current round transmission target may include predicting a response of a user who is not included among the previous round transmission targets among users included in the user group by applying a characteristic of the user to the machine learning model, and adding the user as the current round transmission target based on the predicted response.

The training may include determining whether a sufficient quantity of previous round responses is collected to train the machine learning model, training the machine learning model based on a determination that the sufficient quantity of previous round responses is collected to train the machine learning model, and collecting additional previous round responses based on a determination that the sufficient quantity of previous round responses is not collected to train the machine learning model.

The training may further include training the machine learning model when a preset threshold time elapses even though the sufficient quantity of previous round responses is not collected to train the machine learning model.

The previous round responses may include at least one of an implicitly negative state which an individual user included among the previous round transmission targets does not react even after verifying reception of the instant message, and an explicitly positive state in which an individual user reacts after verifying reception of the instant message.

The determining of the current round transmission target may include determining the current round transmission target such that users predicted to react to the instant message are added based on the trained machine learning model.

According to another aspect, there is provided an apparatus for transmitting an instant message through a plurality of rounds, the apparatus including a memory configured to store therein a program, and a processor configured to execute the program. The program may include collecting previous round responses to an instant message transmitted to previous round transmission targets determined from a user group, identifying users who react to the instant message using a chat room by which the instant message is received based on the previous round responses, training a machine learning model that predicts a response of a user as to whether the user is to react to the instant message based on the previous round responses and characteristics of the identified users, determining a current round transmission target from the user group based on the trained machine learning model, and transmitting the instant message to the determined current round transmission target.

The previous round responses may be determined based on whether users included as the previous round transmission targets react to the instant message using the chat room by which the instant message is received.

The determining of the current round transmission target may include predicting a response of a user who is not included among the previous round transmission target among users included in the user group by applying a characteristic of the user to the machine learning model, and adding the user as the current round transmission target based on the predicted response.

The training may further include determining whether a sufficient quantity of previous round responses is collected to train the machine learning model, training the machine learning model based on a determination that the sufficient quantity of previous round responses is collected to train the machine learning model, and collecting additional previous round responses based on a determination that the sufficient quantity of previous round responses is not collected to train the machine learning model.

The training may further include training the machine learning model when a preset threshold time elapses even though the sufficient quantity of previous round responses is collected to train the machine learning model.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

The following detailed description is provided to assist the reader in gaining a comprehensive understanding of the methods, apparatuses, and/or systems described herein. However, various changes, modifications; and equivalents of the methods, apparatuses, and/or systems described herein will be apparent after an understanding of the disclosure of this application. For example, the sequences of operations described herein are merely examples; and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a,", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed to as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

Figure 1:
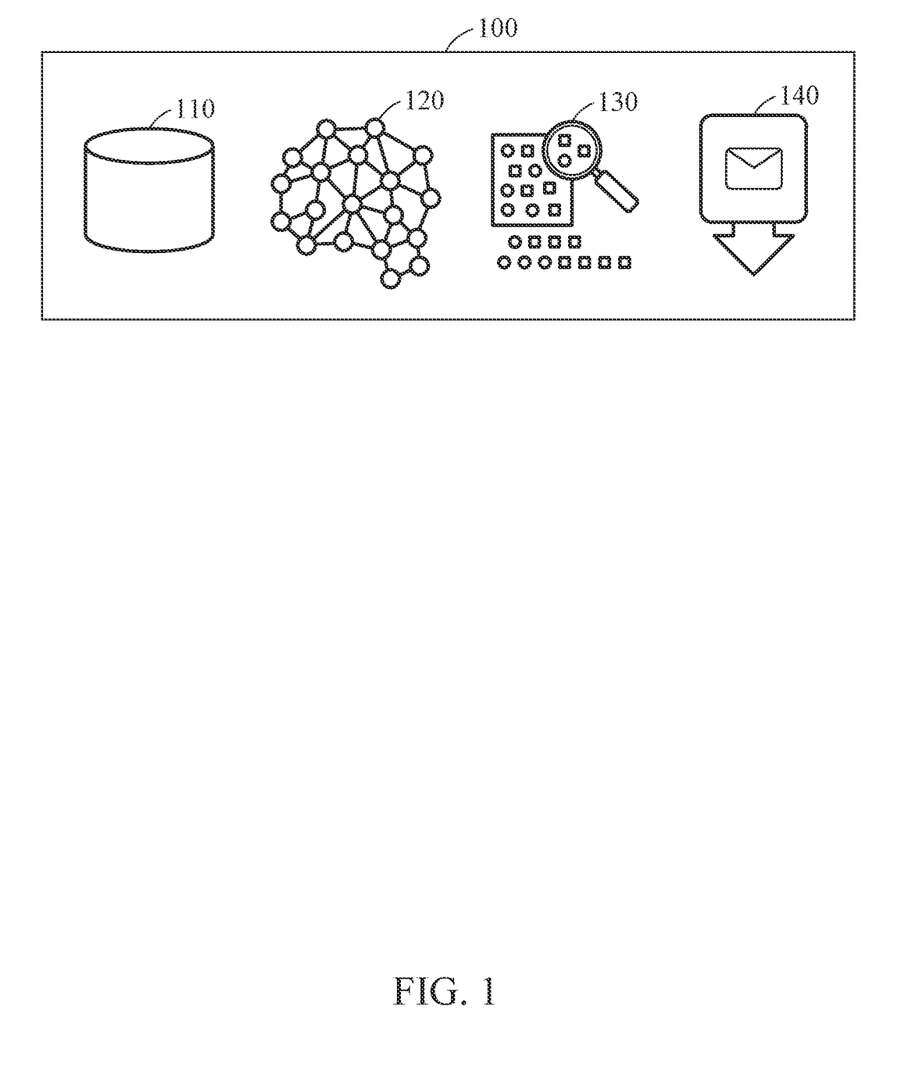
FIG. 1 is a diagram illustrating an example of a configuration of an apparatus for transmitting an instant message according to an example embodiment.

FIG. 1 is a diagram illustrating an example of a configuration of an apparatus for transmitting an instant message according to an example embodiment.

Referring to FIG. 1, an apparatus for transmitting an instant message, hereinafter simply an instant message transmission apparatus 100, may include at least one processor. The processor may perform operations of a collector 110, a machine learning model manager 120, a transmission target determinator 130, and a transmitter 140. The instant message transmission apparatus 100 may refer to an apparatus for transmitting an instant message to a plurality of users through a plurality of rounds, and include, for example, a server that provides an instant messaging service or a server that is interlocked with the server to transmit an instant message. The instant message transmission apparatus 100 may determine a user that is to be a transmission target in each round, and the user will be referred to hereinafter as a transmission target in each round or simply as a round transmission target.

The instant message may be transmitted and received in real time, and whether the instant message is received may be immediately verified. The instant message may include an advertisement-type message for advertising information or a content-type message for delivering contents to users. The content-type message may include a message for notifying users of the contents.

According to an example embodiment, the instant message transmission apparatus 100 may transmit an instant message of the same content to a plurality of users.

A subject that transmits a message through the instant message transmission apparatus 100 may be an official account different from an account of a general user. The official account may refer to an account used to transmit an advertising message or an informative message to a plurality of users on an instant messaging service. For example, the official account may transmit an advertising message to a plurality of users who are friends or transmit an informative message to at least one user irrespective of whether the user is a friend or not. For example, the subject that transmits such messages may be a corporate account e.g., a plus friend).

Based on such a subject that transmits an instant message, a user group including users each corresponding to a target to which the instant message is to be transmitted may be determined. The target to which an instant message is to be transmitted will be hereinafter referred to as a transmission target of an instant message or an instant message transmission target. The user group may include users who have a relationship with the official account from which the message is to be transmitted. For example, the user group may include users each having a messenger account that is in a relationship as a friend with the official account from which the message is to be transmitted. The relationship as a friend will be referred to hereinafter as a friend relationship, in addition, the user group may include users each having a messenger account that subscribes to the official account from which the message is to be transmitted. The user group may also include users each having a messenger account that is to not in a relationship, for example, the friend relationship, with the official account.

The instant message may be generated based on a plurality of elements that constitute the instant message. For example, the instant message transmission apparatus 100 may generate the instant message by determining the elements, for example, a content to be delivered, an image, a text, a font, and a design that represent the content, and a type of the message. According to an example embodiment, the instant message transmission apparatus 100 may receive an instant message from a subject that transmits the instant message, in such a case, the received instant message may include the elements that are already determined.

According to an example embodiment, the instant message transmission apparatus 100 may transmit an instant message through a plurality of rounds. The instant message transmission apparatus 100 that transmits the instant message may determine users who are to be round transmission targets in each round. A round transmission target described herein may be construed as including a user who is determined as a target of receiving an instant message in a round.

The number of users each being as the round transmission target may change as rounds progress. For example, the number of users each being included as the round transmission target may increase as the rounds progress.

The round transmission target may be selected from a user group that is a target of receiving an instant message. For example, one or more users each to be as a round transmission target may be sequentially determined in a round. A method of selecting a round transmission target from a user group will be described in detail hereinafter.

The collector 110 may collect previous round responses to an instant message transmitted to a previous round transmission target determined up to a previous round. A previous round response described herein may refer to a response collected up to a previous round. In addition, a previous round transmission target described herein may be construed as including round transmission target(s) determined in previous round(s) in addition to a round transmission target determined in an immediate previous round. Alternatively, the previous round transmission target may only include the round transmission target determined in the immediate previous round.

For example, in a case in which a current round is a 1oth round, previous round responses may include reactions of round transmission targets in first through k−1th rounds.

The previous round responses may be determined based on whether users each being included as the previous round transmission target react to, for example, click, the instant message. The previous round responses to the instant message may include at least one of an implicitly negative state in which an individual user who is the previous round transmission target does not react even after the user receives the instant message and an explicitly positive state in which an individual user reacts after the user receives the instant message.

According to an example embodiment, a response collected in response to an instant message may include information as to whether a user who receives the instant message connects to a chat room and views the instant message.

The collected response to the instant message may include information as to whether the user who receives the instant message selects the instant message and verifies detailed related contents. In such a case, selecting the instant message may include touching the instant message and reacting to the instant message. For example, whether the detailed related contents are verified or not by the user may correspond to whether a file corresponding to the instant message, for example, a long text message, an image message, and a voice message, is opened. For another example, whether the detailed related contents are verified or not by the user may correspond to whether a movement to a web page connected to the instant message occurs through a uniform resource locator (URL) included in the instant message.

The collected response to the instant message may include information as to whether the user who receives the instant message performs a further action that is expected by a subject that transmits the message after the user selects the instant message and verifies the detailed related contents. The further expected action may include, for example, downloading a coupon, watching an image or a video, or moving to another web page.

Based on such a response collected by the collector 110, an instant message reaction rate may be calculated. The instant message reaction rate may correspond to a ratio of users who respond to the instant message to users who verify their reception of the instant message. For example, the instant message reaction rate, for example, a click-through rate (CTR), may be calculated by dividing the number of explicit positive responses to the instant message by the number of users each being included as a round transmission target who receive the instant message.

When the instant message reaction rate is determined to be less than a preset threshold reaction rate, the instant message transmission apparatus 100 may suspend transmitting the instant message.

According to an example embodiment, a reaction rate may be calculated for each round based on responses collected in each round, and whether the calculated reaction rate is less than the threshold reaction rate may be determined for each round. According to an example embodiment, a reaction rate may be calculated based on responses collected in a plurality of rounds, and whether the calculated reaction rate is less than a preset threshold reaction rate may be determined.

The collector 110 may transmit the collected previous round responses to the machine learning model manager 120. The machine learning model manager 120 may control a machine learning model to be trained to predict whether a user with a certain characteristic will respond to the instant message based on the previous round responses and characteristics of users who respond up to the previous round. For example, the machine learning model may be trained using, as training data, the previous round responses and the characteristics of the users who respond up to the previous round. The trained machine learning model may receive the characteristic of the user as an input and predict a response of the user based on the received characteristic of the user. A response of a user predicted by the machine learning model may be output in a form of a score corresponding to a response or reaction rate of the user.

For example, in response to the characteristic of the user being input to the machine learning model, the machine learning model may predict and output a score or a probability indicating whether the user will react to the instant message. Although to be described in detail hereinafter, the instant message transmission apparatus 100 may predict a response rate of users who do not receive the instant message yet using the machine learning model trained based on the previous round responses, and determine a current round transmission target.

The machine learning model manager 120 included in the instant message transmission apparatus 100 may determine whether a sufficient quantity of previous round responses is collected to train the machine learning model. The machine learning model may determine by itself whether a quantity of previous round responses that is sufficient to train the machine learning model is collected. For the convenience of description, examples in which the machine learning model determines by itself whether the sufficient quantity of previous round responses is collected for training will be described hereinafter.

The machine learning model may be trained based on a determination that the sufficient quantity of previous round responses has been collected to train the machine learning model. The machine learning model may wait for additional previous round responses to be collected based on a determination that an insufficient quantity of previous round responses has been collected to train the machine learning model.

However, the machine learning model may be trained when a predetermined threshold time elapses even though the sufficient quantity of previous round responses has not been collected up to the previous round to train the machine learning model, thereby preventing an excessive amount of time from being used for a single round.

According to an example embodiment, the instant message transmission apparatus 100 may adjust a time associated with transmission of an instant message based on a determination that a sufficient quantity of previous round responses has not been collected to train the machine learning model for a current round. For example, the instant message transmission apparatus 100 may wait for additional previous round responses to be collected. For another example, when the collection of responses to messages transmitted in a previous round is delayed or the responses are not collected, the instant message transmission apparatus 100 may adjust a time interval for transmitting the instant message in the current round to increase.

According to an example embodiment, the instant message transmission apparatus 100 may adjust the number of round transmission targets to increase to collect a quantity of previous round responses that is sufficient to train the machine learning model for the current round. According to an example embodiment, the instant message transmission apparatus 100 may use only some responses among responses in first through k−1th rounds to train the machine learning model in a current round, for example, a round. For example, to determine whether a sufficient quantity of responses is collected to train the machine learning model in the current round or the kth round, the instant message transmission apparatus 100 may use only responses from the k−1th round.

For the convenience of description, examples in which the instant message transmission apparatus 100 uses previous round responses, for example, k−1th round responses, to an instant message to train the machine learning model in a current round, for example, a kth round, will be described hereinafter.

A characteristic of a user may include at least one of a region associated with the user, a demographic characteristic associated with the user, an official account with which the user has a relationship, a period of time for which the user and the official account are in a relationship, the number of instant messages received by the user for a preset time interval, and a profile associated with the user. The region associated with the user may include a residential area, a working area, a region of origin, and the like of the user. The demographic characteristic associated with the user may include gender, age, occupation, income, and educational background, and at least a portion of which may be the same as the profile associated with the user. The official account with which the user has a relationship may be associated with a field of interest of the user.

The characteristic of the user may be determined based on a response that reacts to an individual instant message received by the user or a response that does not react to an individual instant message received by the user. For example, the characteristic of the user may be determined based on a list of instant messages to which the user reacted after verifying the reception of the instant messages and/or a list of instant messages to which the user did not react after verifying the reception of the instant messages.

The characteristic of the user may include histories of using services by the user in connection with the official account for a preset period of time or histories of suspending the services by the user. For example, the characteristic of the user may include a history of suspending the use of a music streaming service in connection with the official account for a past month.

The transmission target determinator 130 may determine a current round transmission target corresponding to at least a portion of the user group based on the trained machine learning model. The user group may be a group including users, each of whom may become a candidate for an instant message transmission target. For example, the transmission target determinator 130 may predict response or reaction rates of users who are not previous round transmission targets among the users in the user group by applying, to the machine learning model, characteristics of the users, and add at least a portion of the users who are not the previous round transmission targets as the current round transmission target based on the predicted response rates.

The transmission target determinator 130 may determine the current round transmission target such that users predicted to react to the instant message are added. Responses of the users predicted to react to the instant message may be predicted to be explicitly positive.

A detailed operation of the machine learning model will be described with reference to FIGS. 2 and 5. A detailed operation of the transmission target determinator 130 will be described with reference to FIG. 2.

The transmitter 140 may transmit an instant message to the determined current round transmission target. Responses output in response to the instant message received by users each being as the current round transmission target may be collected by the collector 110 for a subsequent round.

As described above, the instant message transmission apparatus 100 may determine an instant message transmission target such that an instant message is to be transmitted to users from which explicit positive responses are predicted to receive based on the machine learning model. The instant message transmission apparatus 100 may adjust a learning rate of the machine learning model, further a rate of determining the instant message transmission target, by determining whether a sufficient quantity of responses is collected to train the machine learning model. Although to be described hereinafter, the instant message transmission apparatus 100 may also perform a plurality of operations for determining targets to which a plurality of instant messages is to be transmitted in each round.

According to an example embodiment, the instant message transmission apparatus 100 may output a final transmission amount associated with an instant message. The final transmission amount may be counted in a process of collecting responses in each round. The final transmission amount may include the number of users each being included as a round transmission target in each round. The final transmission amount may correspond to a preset amount.

When an identification (ID) of an account corresponding to the transmission target is duplicated or a transmission failure occurs due to a change in a friend relationship with an official account, the final transmission amount may be less than an initially set number of transmission targets. Thus, when an arrival amount is considered significant, the number of transmission targets may be set to be greater.

Figure 2:
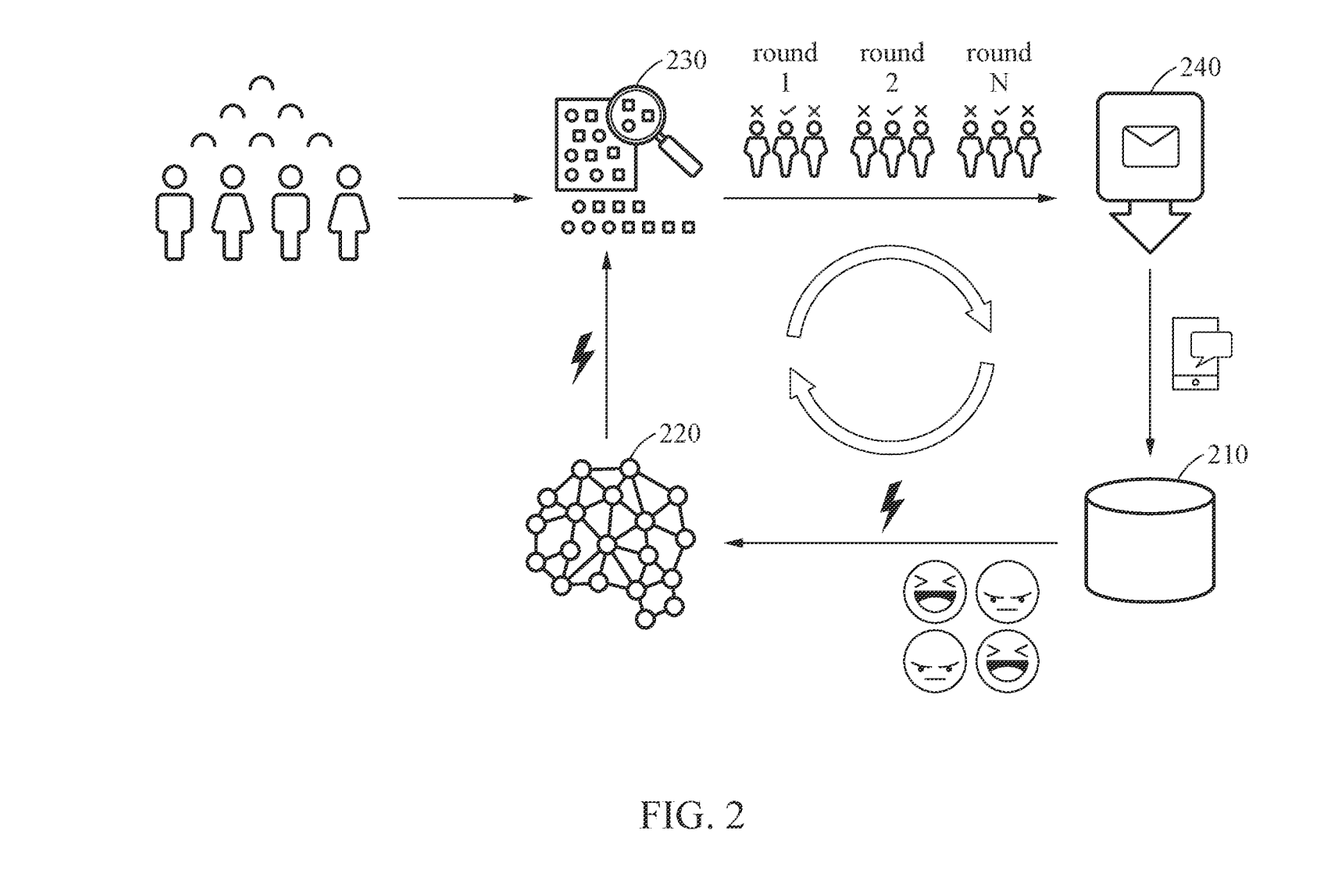
FIG. 2 is a diagram illustrating an example of a method of determining a transmission target of an instant message according to an example embodiment.

FIG. 2 is a diagram illustrating an example of a method of determining a transmission target of an instant message according to an example embodiment.

Referring to FIG. 2, an instant message transmission apparatus may transmit an instant message through a plurality of rounds. The instant message transmission apparatus may correspond to the instant message transmission apparatus 100 in FIG. 1.

The instant message transmission apparatus may transmit the instant message bye automatically selecting users who are highly likely to respond among users included in a user group. The number of users who are to receive the instant message through the rounds may be limited beforehand. For example, the number of users may be set to a preset percentage, for example, 50%, of users included in a user group who have a friend relationship with an official account.

Even though a filtering function, for example, gender filtering, is applied to the user group, the number of users to which the instant message is to be transmitted may be set to a preset percentage of users in a group after the filtering. For example, at a request "please transmit a message to 50% users in order starting from a user predicted to most positively respond of all female users among plus friend subscribers," the female users may be selected front a user group who have the friend relationship with an official account, and the instant message may then be transmitted to only 50% of the selected female users.

When the number of users who are to receive the instant message is determined, the number of users to whom the instant message is to be transmitted in each round of the rounds may also be determined. For example, the instant message may be transmitted to only a relatively small number of users in initial rounds and be transmitted to a relatively greater number of users in later rounds. As the rounds progress, the number of users who react to the instant message may be accumulated, increasing the reliability of a machine learning model. The number of round transmission targets may increase based on the reliability of the machine learning model.

For another example, the instant message may be determined to be transmitted to the same number of users from a middle round to a later round. For still another example, the instant message may be determined to be transmitted to the same number of users in all the rounds.

In detail, in a first round, the instant message transmission apparatus may determine a first round transmission target and transmit an instant message to the determined transmission target. The first round transmission target of the instant message may be at least a portion of a user group, as described above.

In the first round, there are not previous round responses and users who respond up to a previous round. In such a case, users selected from the user group, for example, users who have a friend relationship with an official account from which the instant message is to be transmitted, may be determined as the first round transmission target. Alternatively, users selected from the user group after being filtered through, for example, gender filtering, under a condition according to a characteristic of the instant message may be determined as the first round transmission target.

According to examples, in the first round, a machine learning model 220 may be trained based on user response data and user characteristics data that are separately input thereto. The machine learning model 220 may correspond to the machine learning model in FIG. 1. The user response data and the user characteristics data that are to be input may be randomly venerated. When the machine learning model 220 is trained based on the user response data and the user characteristics data, a transmission target determinator 230 may determine the first round transmission target based on the machine learning model 220, as in a kth round to be described hereinafter. The transmission target determinator 230 may correspond to the transmission target determinator 130 in FIG. 1.

When a current round is the first round, the machine learning model 220 may not be trained during the current round. The transmission target determinator 230 may determine the first round transmission target irrespective of user responses and user characteristics. For example, the instant message transmission apparatus may determine the first round transmission target by extracting a random portion of users from the user group. A transmitter 240 may transmit the instant message to the determined first round transmission target. The transmitter 240 may correspond to the transmitter 140 in FIG. 1.

When the current round is not the first round but, for example, a kth round (in which k denotes a natural number greater than or equal to 2), a collector 210 may collect previous round responses up to a previous round, for example, a k−1th round, that react to the instant message transmitted to previous round transmission targets up to the k−1th round. The collector 210 may correspond to the collector 110 in FIG. 1.

In the kth round, the collector 210 may transmit the collected previous round responses up to the k−1th round to a machine learning model manager. By the machine learning model manager, the machine learning model 220 may be trained again from the beginning without being dependent on previous training results. The machine learning model 220 may be trained using, as training data, the previous round responses collected up to the k−1th round and characteristics of users who respond up to the k−1th round.

For the convenience of description, examples in which the machine learning model 220 is trained from the beginning using, as training data, previous round responses collected up to a previous round and characteristics of users who respond up to the previous round, each time a current round progresses after the previous round is completed, will be described hereinafter.

However, a method of training the machine learning model 220 may change in accordance with design. For example, when a subsequent round progresses, the machine learning model 220 may be trained with accumulated training data. In such a case, in the kth round, the machine learning model 220 which is already trained in the k−1th round may be additionally trained by adding, to the training data of the trained machine learning model 220, the previous round responses collected up to the k−1th round and the characteristics of the users who respond up to the k−1th round. Alternatively, in other cases, the machine learning model 220 may be trained using, as the training data, only previous round responses in an immediately previous round and characteristics of users who respond in the immediately previous round.

In the kth round, the transmission target determinator 230 may determine a kth round transmission target based on the trained machine learning model 220. For example, the transmission target determinator 230 may predict response or reaction rates of users who are not previous round transmission targets by applying, to the machine learning model 220, characteristics of the users.

The users of which the characteristics are to be applied to the machine learning model 220 by the transmission target determinator 230 may not be the previous round transmission targets. For example, a user of which characteristics are to be applied to the machine learning model 220 by the transmission target determinator 230 in the kth round may be a user who is not determined as a transmission target in the k−1th round. Alternatively, the users of which characteristics are to be applied to the machine learning model 220 by the transmission target determinator 230 in the kth round may be a user who has not been a transmission target in any round among the first through k−1 th rounds.

The transmission target determinator 230 may sort the users based on the predicted response rates. The transmission target determinator 230 may select upper-rank users, the number of which may correspond to the number of k−1th round transmission targets.

As described above, the number of users included as the k−1th round transmission targets may be predetermined beforehand as a condition to determine a k−1th round transmission target. For example, when the number of users included as the k−1th round transmission targets is predetermined as A, the transmission target determinator 230 may determine the k−1th round transmission targets by sequentially selecting A users who are highly likely to show an explicit positive response.

Alternatively, the transmission target determinator 230 may add, as the k−1th round transmission targets, users from which explicit positive responses are predicted based on an output of the machine learning model 220. For example, the transmission target determinator 230 may apply, to the machine learning model 220, a characteristic of a user who is randomly selected from among users who are not previous round transmission targets and predict whether the user will react in an explicitly positive way based on a response rate of the user that is output by the machine learning model 220. In this example, the transmission target determinator 230 may predict whether the user will react in an explicitly positive way based on whether the predicted response rate is greater than a preset threshold probability, for example, 70%.

According to an example embodiment, the machine learning model 220 may be an explainable artificial intelligence (XAI) model. In such a case, characteristics of users who are predicted to have great response rates by the trained machine learning model 220 may be analyzed. For example, an instant message may be analyzed to have a great response rate of users with a first characteristic and a less response rate of users with a third characteristic. In this example, a second characteristic may be irrelevant to a response rate. The transmission target determinator 230 may determine the k−1th round transmission targets based on a result of the analyzing.

The transmitter 240 may transmit the instant message to the determined k−1th round transmission targets. When the transmission of the instant message is not completed in the kth round, responses output in response to the instant message received by the users included as the k−1th round transmission targets may be collected as previous round responses by the collector 210 in a k+1th round. The kth round transmission targets may be previous round transmission targets in the kith round.

Figure 3:
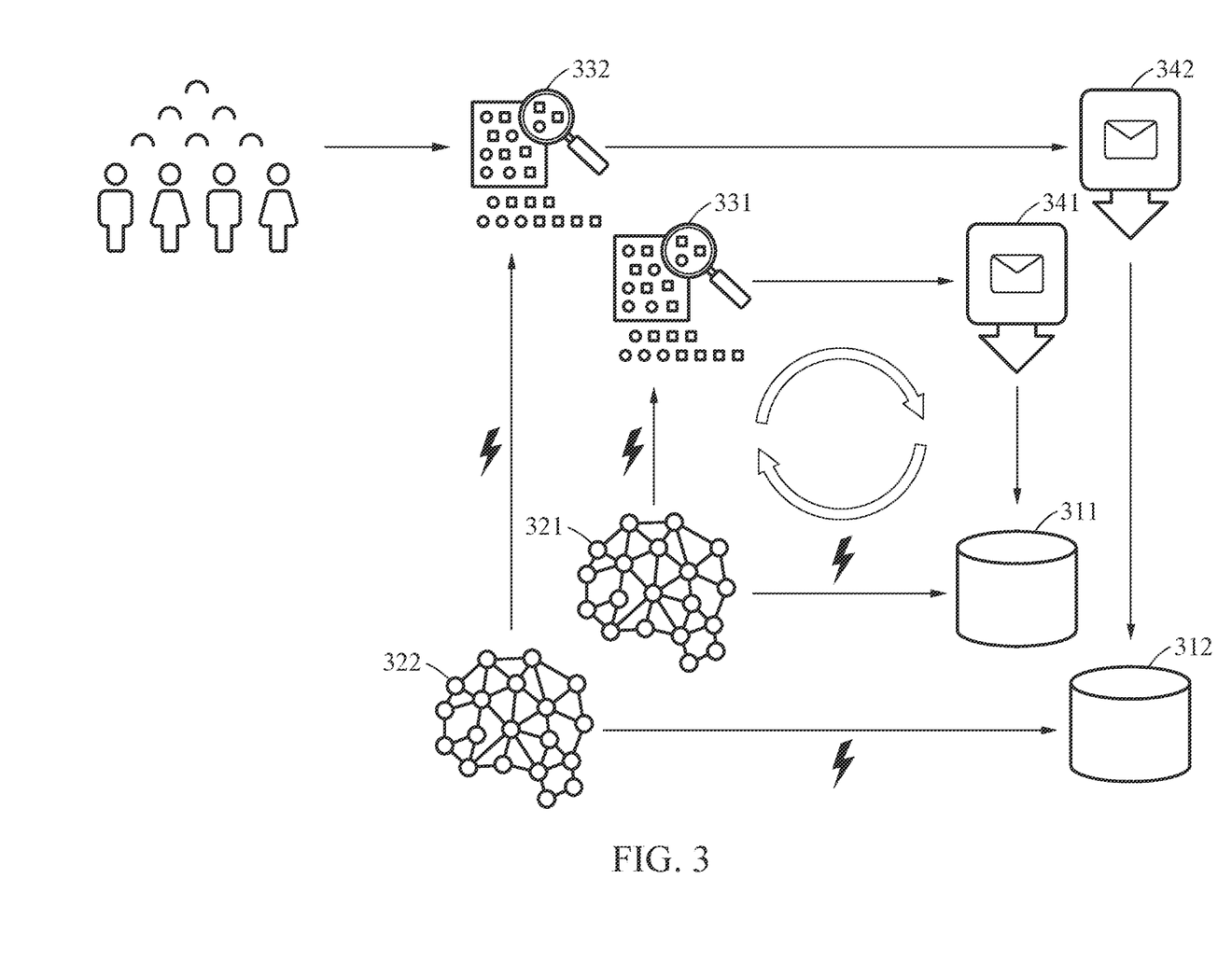
FIG. 3 is a diagram illustrating an example of a method of determining a transmission target of a plurality of instant messages according to an example embodiment.

FIG. 3 is a diagram illustrating an example of a method of determining a transmission target of a plurality of instant messages according to an example embodiment.

Referring to FIG. 3, an instant message transmission apparatus may transmit a plurality of instant messages through a plurality of rounds. The instant message transmission apparatus may correspond to the instant message transmission apparatus 100 in FIG. 1. The instant message transmission apparatus may simultaneously perform a plurality of operations for determining transmission targets of the instant messages in a single individual round.

For the convenience of description, examples in which the instant message transmission apparatus determines the transmission targets of the instant messages in one time frame including the rounds will be described hereinafter. However, the examples are provided merely for the convenience of description, and a plurality of rounds for transmitting an instant message and a plurality of rounds for transmitting another instant message may only be partially the same.

To transmit an instant message (hereinafter, a first instant message) and another instant message (hereinafter, a second instant message) that is different from the first instant message through a plurality of rounds, a collector may collect responses to the first instant message transmitted to previous round transmission targets of the first instant message and collect responses to the second instant message transmitted to previous round transmission targets of the second instant message. The collector may correspond to the collector 110 in FIG. 1. The collector may include a plurality of sub-collectors configured to perform a collecting operation. In such a case, as illustrated, a first sub-collector 311 may collect the responses to the first instant message, and a second sub-collector 312 may collect the responses to the second instant message.

The collector may transmit such previous round responses to a machine learning model manager. A machine learning model may be trained using, as training data, the previous round responses to the first instant message, characteristics of users who respond to the first instant message up to a previous round, the previous round responses to the second instant message, and characteristics of users who respond to the second instant message up to the previous round. The machine learning model may include a first machine learning model 321 and a second machine learning model 322, The first machine learning model 321 may be trained using, as training data, the previous round responses to the first instant message and the characteristics of the users who respond to the first instant message up to the previous round. The second machine learning model 322 may be trained using, as training data, the previous round responses to the second instant message and the characteristics the users who respond to the second instant message up to the previous round.

A transmission target determinator may determine a current round transmission target based on the trained machine learning model. The transmission target determinator may correspond to the transmission target determinator 130 in FIG. 1. The transmission target determinator may determine a current round transmission target of the first instant message and another current round transmission target which is a current round transmission target of the second instant message.

The transmission target determinator may predict a response of a user who is not included in the previous round transmission targets by applying a characteristic of the user to the machine learning model and add, as the current round transmission target, a user Whose response is predicted to be an explicit positive response. The transmission target determinator may apply characteristics of users who are not the previous round transmission targets to the first machine learning model 321, and apply characteristics of users who are not other previous round transmission targets to the second machine learning model 322.

The transmission target determinator may include a first sub-transmission target determinator 331 and a second sub-transmission target determinator 332. The first sub-transmission target determinator 331 may apply, to the first machine learning model 321, the characteristics of the users who are not the previous round transmission targets. The second sub-transmission target determinator 331 may apply, to the second machine learning model 322, the characteristics of the users who are not the other previous round transmission targets.

The transmission target determinator may determine the current round transmission target and the other current round transmission target such that the previous round transmission targets, the current round transmission target, the other previous round transmission targets, and the other current round transmission target are distinguished from one another.

A transmitter may transmit an instant message to a determined current round transmission group. The transmitter may correspond to the transmitter 140 in FIG. 1. The transmitter may transmit the first instant message to the current round transmission target and transmit the second instant message to the other current round transmission target. The transmitter may include a first sub-transmitter 341 and a second sub-transmitter 342, The first sub-transmitter 341 may transmit the first instant message to the current round transmission target, and the second sub-transmitter 342 may transmit the second instant message to the other current round transmission target.

Figure 4:
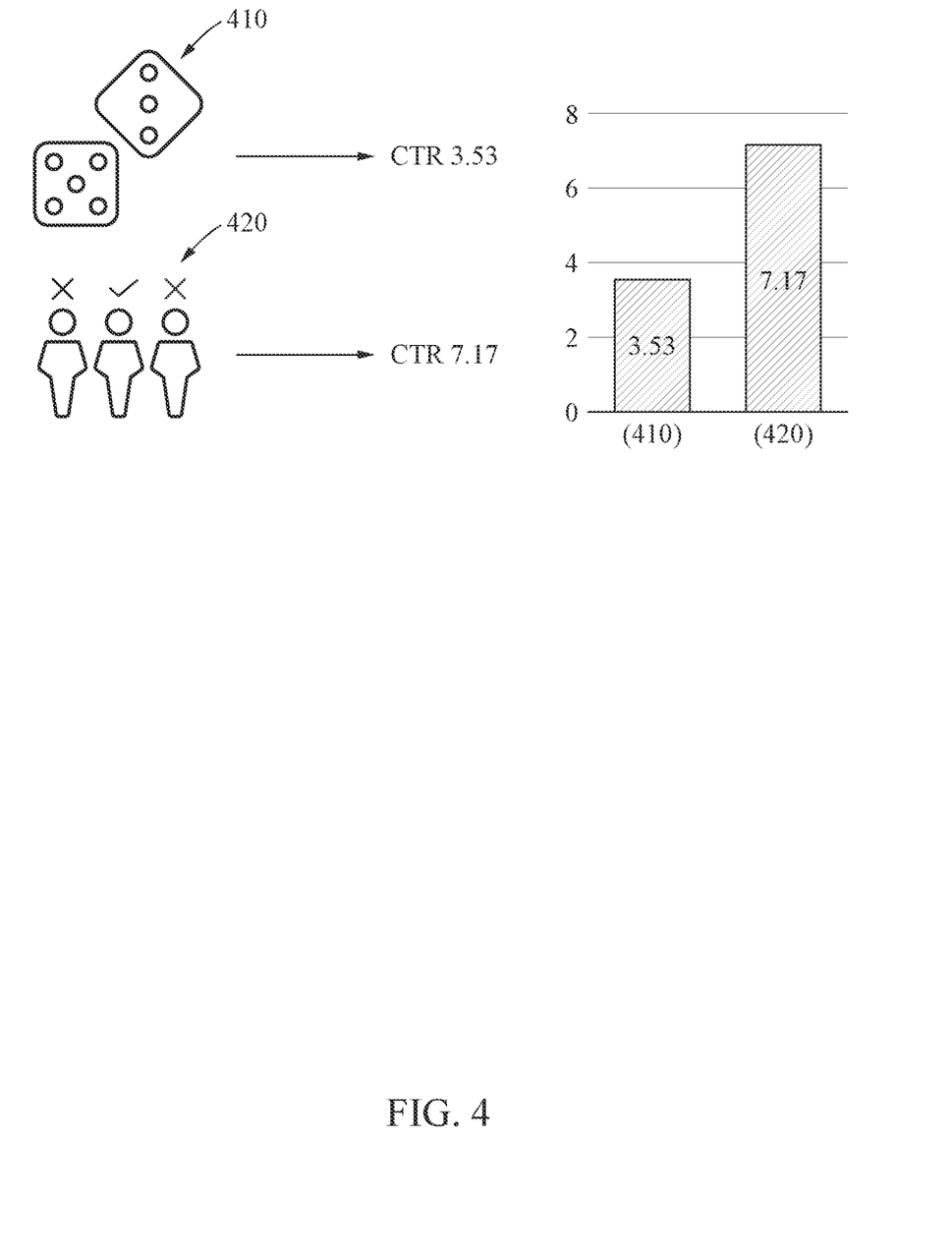
FIG. 4 is a diagram illustrating an example of an effect of a method of determining a transmission target of an instant message according to an example embodiment.

FIG. 4 is a diagram illustrating an example of an effect of a method of determining a transmission target of an instant message according to an example embodiment.

Referring to FIG. 4, the instant message transmission apparatus 100 in FIG. 1 may determine a transmission target of an instant message through a plurality of rounds and transmit the instant message to the determined transmission target. In a case 420 in which a transmission target of an instant message is determined based on operations of the instant message transmission apparatus 100, a reaction rate of users who are transmission targets may be greater compared to a case 410 in which a transmission target of the same instant message is determined randomly. The reaction rate may correspond to the reaction rate described above with reference to FIG. 1. For example, in the case 410 in which a transmission target of the same instant message is determined randomly, the reaction rate of the users each being as the transmission target may be 3.53%. In contrast, in the case 420 in which a transmission target of the instant message is determined based on the operations of the instant message transmission apparatus 100, the reaction rate of the users each being as the transmission target may be 7.17%.

Figure 5:
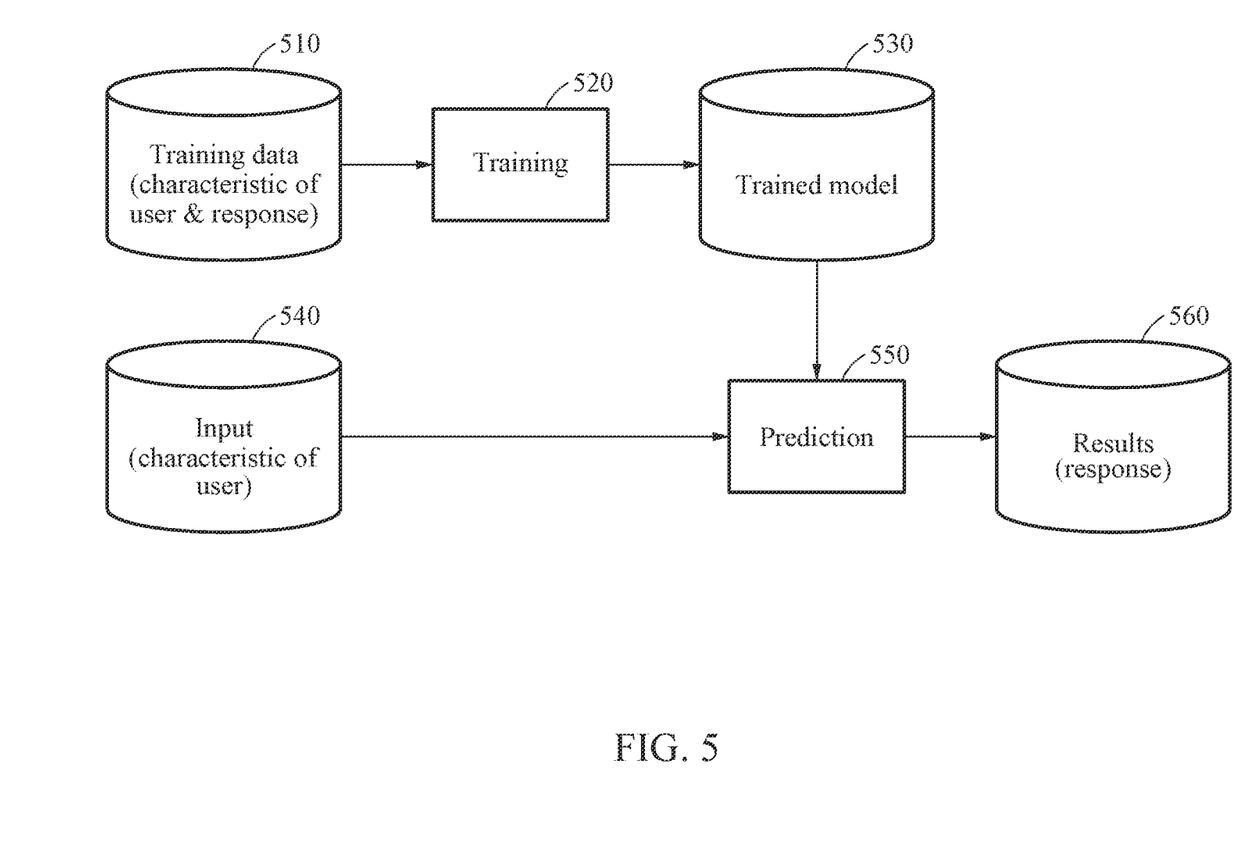
FIG. 5 is a diagram illustrating an example of an operation of a machine learning model according to an example embodiment.

FIG. 5 is a diagram illustrating an example of an operation of a machine learning model according to an example embodiment.

Referring to FIG. 5, a machine learning model may be trained in operation 520 based on training data 510. A trained machine learning model 530 may receive a new input 540 and predict characteristics of the new input 540 based on the trained characteristics in operation 550. The trained machine learning model 530 may output results 560 obtained by predicting the characteristics of the new input 540 in operation 550.

The machine learning model described above with reference to FIG. 1 may operate based on operations of the machine learning model described with reference to FIG. 5. The machine learning model in FIG. 1 may be trained in operation 520 using, as the training data, 510, characteristics of users who respond up to a previous round and previous round responses. The trained machine learning model in FIG. 1 may receive characteristics of new users as an input and predict a response rate of the new users based on a relationship between the characteristics of the users who respond up to the previous round and the previous round responses. The trained machine learning model in FIG. 1 may correspond to the trained machine learning model 530, the characteristics of the new users may correspond to the new input 540, and the relationship between the characteristics of the users who respond up to the previous round and the previous round responses may correspond to the trained characteristics. The trained machine learning model in FIG. 1 may output the results 560 obtained by predicting the response rate of the new users based on the characteristics of the new users in operation 550.

Figure 6:
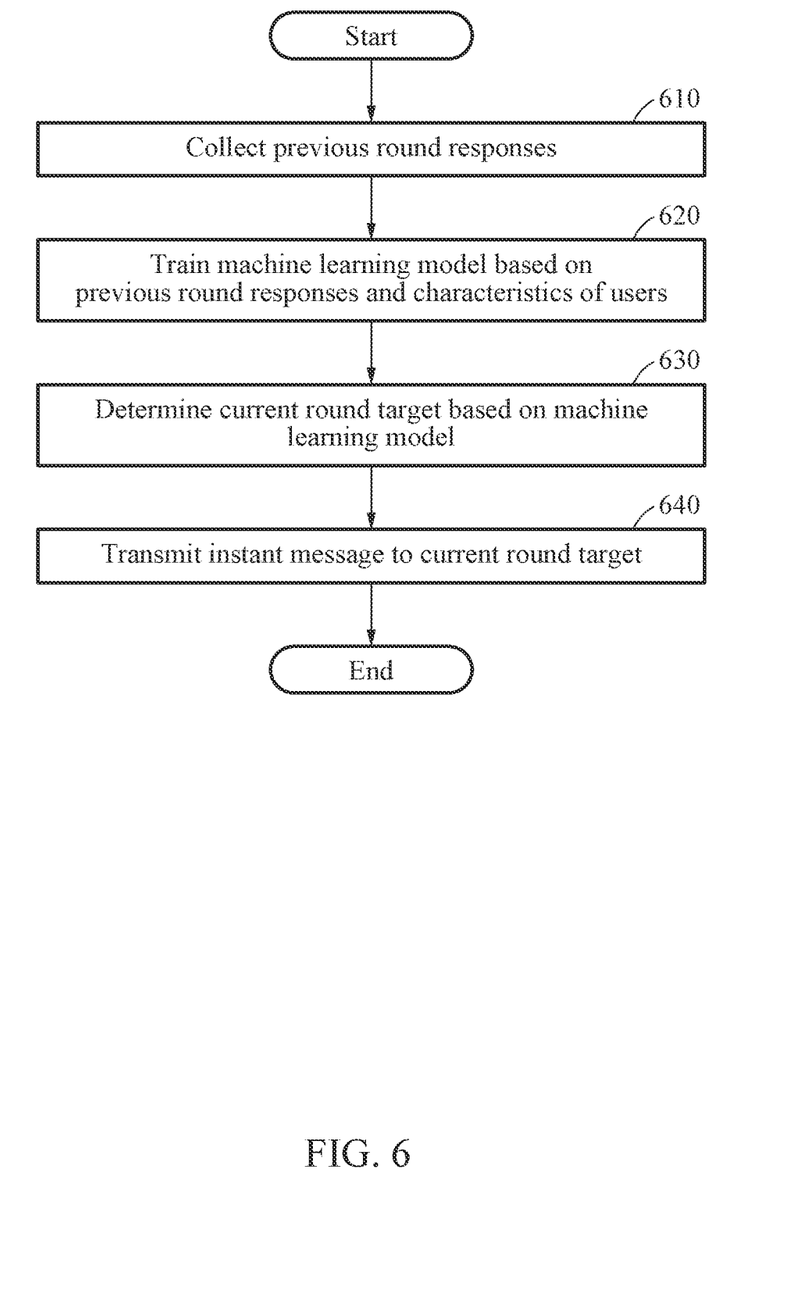
FIG. 6 is a flowchart illustrating an example of a method of transmitting an instant message according to an example embodiment.

FIG. 6 is a flowchart illustrating an example of a method of transmitting an instant message according to an example embodiment.

Referring to FIG. 6, an instant message transmission apparatus may transmit an instant message through a plurality of rounds. The instant message transmission apparatus may correspond to the instant message transmission apparatus 100 in FIG. 1.

In operation 610, the instant message transmission apparatus may collect previous round responses to an instant message transmitted to a previous round transmission target corresponding to at least a portion of a user group. An operation of collecting the previous round responses may be performed by the collector 110 included in the instant message transmission apparatus 100 in FIG. 1.

The instant message transmission apparatus may identify users who react to the instant message using a chat room by which the instant message is received, based on the previous round responses. In operation 620, the instant message transmission apparatus may train a machine learning model that predicts a user response based on the previous round responses and characteristics of the identified users.

In operation 630, the instant message transmission apparatus may determine a current round transmission target corresponding to at least a portion of the user group. The current round transmission target described herein may be construed as being a group including current round transmission targets, in addition to an individual current round transmission target. An operation of determining the current round transmission target may be performed by the transmission target determinator 130 included in the instant message transmission apparatus 100.

In operation 640, the instant message transmission apparatus may transmit the instant message to the determined current round transmission target. An operation of transmitting the instant message to the current round transmission target may be performed by the transmitter 140 included in the instant message transmission apparatus 100.

Although not illustrated, the instant message transmission apparatus may include a processor and a memory. The processor may perform at least one of the operations or methods described above with reference to FIGS. 1 through 6. The memory may store at least one of the number of users who are included as current round transmission targets, a threshold time, a threshold reaction rate, a threshold probability, and an architecture of the machine learning model, or store a program in which the method of transmitting an instant message is implemented.

The processor may execute the program and control the instant message transmission apparatus. A code of the program executed by the processor may be stored in the memory. The instant message transmission apparatus may provide a user interface through an input and output module and exchange data with an external device by being connected to the external device through a communication module.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An operating method of a sever for transmitting an instant message through a plurality of rounds, the operating method comprising:
    collecting previous round responses to an instant message transmitted to previous round transmission targets determined from a user group;
    identifying users who react to the instant message using a chat room by which the instant message is received based on the previous round responses;
    training a machine learning model that predicts a response of a user as to whether the user is to react to the instant message based on the previous round responses and characteristics of the identified users;
    determining a current round transmission target from the user group based on the trained machine learning model; and
    transmitting the instant message to the determined current round transmission target,
        wherein the previous round responses are determined based on whether users included as the previous round transmission targets react to the instant message using the chat room by which the instant message is received.

2. The operating method of claim 1, wherein the determining of the current round transmission target comprises:
    predicting a response of a user who is not included among the previous round transmission targets among users included in the user group by applying a characteristic of the user to the machine learning model; and
    adding the user as the current round transmission target based on the predicted response.

3. The operating method of claim 1, wherein the training comprises:
    determining whether a sufficient quantity of previous round responses is collected to train the machine learning model;
    training the machine learning model based on a determination that the sufficient quantity of previous round responses is collected to train the machine learning model; and
    collecting additional previous round responses based on a determination that the sufficient quantity of previous round responses is not collected to train the machine learning model.

4. The operating method of claim 3, wherein the training further comprises:
    training the machine learning model when a preset threshold time elapses even though the sufficient quantity of previous round responses is not collected to train the machine learning model.

5. The operating method of claim 1, wherein the previous round responses comprise at least one of:
    an implicitly negative state in which an individual user included among the previous round transmission targets does not react even after verifying reception of the instant message; and
    an explicitly positive state in which an individual user reacts after verifying reception of the instant message.

6. The operating method of claim 1, wherein the determining of the current round transmission target comprises:
    determining the current round transmission target such that users predicted to react to the instant message are added based on the trained machine learning model.

7. A non-transitory computer-readable storage medium storing instructions that, when executed by a processor, cause the processor to perform an operating method comprising:
    collecting previous round responses to an instant message transmitted to previous round transmission targets determined from a user group;
    identifying users who react to the instant message using a chat room by which the instant message is received based on the previous round responses;
    training a matching learning model that predicts a response of a user as to whether the user is to react to the instant message based on the previous round responses and characteristics of the identified users;
    determining a current round transmission target from the user group based on the trained machine learning model; and
    transmitting the instant messages to the determined current round transmission target,
        wherein the previous round responses are determined based on whether users included as the previous round transmission targets react to the instant message using the chat room by which the instant message is received.

8. An apparatus for transmitting an instant message through a plurality of rounds, the apparatus comprising:
    a memory configured to store therein a program; and
    a processor configured to execute the program,
        wherein the program comprises:
            collecting previous round responses to an instant message transmitted to previous round transmission targets determined from a user group;
            identifying users who react to the instant message using a chat room by which the instant message is received based on the previous round responses;
            training a machine learning model that predicts a response of a user as to whether the user is to react to the instant message based on the previous round responses and characteristics of the identified users;
            determining a current round transmission target from the user group based on the trained machine learning model; and
            transmitting the instant message to the determined current round transmission target,
                wherein the previous round responses are determined based on whether users included as the previous round transmission targets react to the instant message using the chat room by which the instant message is received.

9. The apparatus of claim 8, wherein the determining of the current round transmission target comprises:
    predicting a response of a user who is not included among the previous round transmission target among users included in the user group by applying a characteristic of the user to the machine learning model; and
    adding the user as the current round transmission target based on the predicted response.

10. The apparatus of claim 8, wherein the training further comprises:
    determining whether a sufficient quantity of previous round responses is collected to train the machine learning model;
    training the machine learning model based on a determination that the sufficient quantity of previous round responses is collected to train the machine learning model; and collecting additional previous round responses based on a determination that the sufficient quantity of previous round responses is not collected to train the machine learning model.

11. The apparatus of claim 10, wherein the training further comprises:

training the machine learning model when a preset threshold time elapses even though the sufficient quantity of previous round responses is collected to train the machine learning model.

* * * * *